Oct. 2, 1956   L. RADO   2,764,862
MULTIPLE WELDING TOOLS
Filed Jan. 9, 1953

INVENTOR.
LEOPOLD RADO
BY
Wilkinson Mawhinney
Attorneys

United States Patent Office 2,764,862
Patented Oct. 2, 1956

2,764,862

MULTIPLE WELDING TOOLS

Leopold Rado, London, England; Dorothy Frances Pickering, executrix of said Leopold Rado, deceased Application January 9, 1953, Serial No. 330,424

4 Claims. (Cl. 53—180)

The present invention relates to improvements in multiple welding tools and has for an object to provide a multiple welding tool for use in the production of individual plastic containers produced from a length of thermoplastic tubing.

The present invention is to be used for carrying out the process described in my United States Patent No. 2,530,400 in accordance with which a length of tubing made of thermoplastic substance such as vinyl resin, in particular polyvinyl chloride, polyethylene, rubber hydrochloride, or the like, is filled with a fluid substance and pressure is applied laterally by a pair of tools to the filled tubing at distances apart equal to the length of a single container to displace the contents at the pressure places, and after the walls of the tubing have contacted each other, heat is generated by the said pair of tools to weld the tubing together at the pressed places.

To speed up production a multiple welding tool is to be used consisting of two or more welding parts arranged parallel to each other and at distances from each other equal to the length of a single container to be produced, and on using the said pair of tools, with one pressure the arranged parallel parts displace the contents in the filled tubing, and on welding the pressed places thereby form according to the number of pressure parts, two or more filled packages.

Experience has shown that on applying pressure laterally on the filled thermoplastic tubing by a pair of tools having two or more laterally arranged presser parts, the contents of each compartment will contain different quantities of the fluid substance in spite of the distances between the said presser parts being equal. The reason for this is that the displaced contents of the filled tubing will move more speedily backwards when under the application of pressure from that part of the tool nearest to the open end of the tubing than will the contents displaced under the application of pressure from that part of the tool nearest to the sealed end of the tubing. Consequently, the latter container produced, i. e. that nearest to the sealed end of the tubing, will contain more fluid substance than the other container or containers.

It has been found that a pair of welding tools can be used whereby at equal distances from each other and parallel to each other, opposed presser parts are arranged of which all but one are springloaded and mobile, so that on applying pressure by said pair of tools firstly the contents will be displaced by that opposed presser part which is nearest to the sealed end of the filled tubing, and thereafter the second opposed presser part displaces the contents and so on, until all further presser parts have come into action and consequently the displaced fluid substance has time to move backward in the tubing in the direction of the open end thereof.

The accompanying drawing illustrates the invention:

Figure 1:
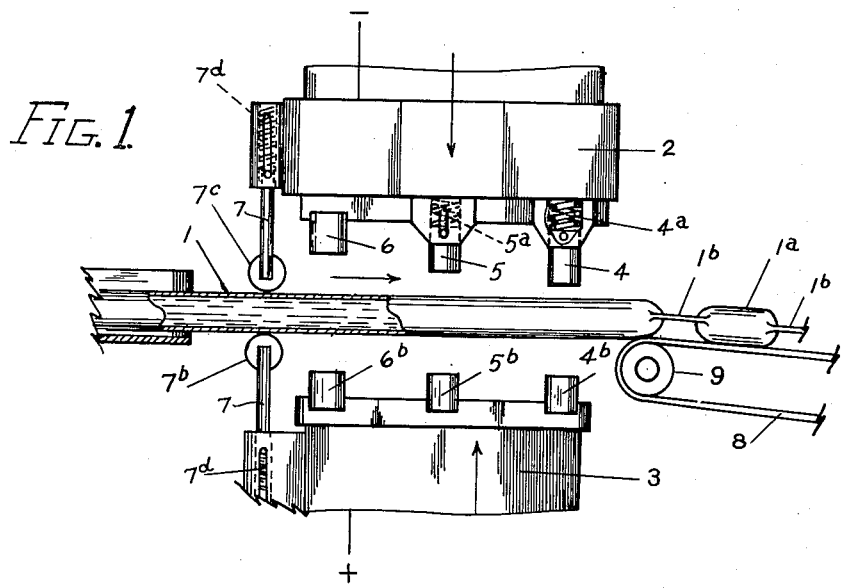
Figure 1 shows in side view, the press open.
Figure 2:
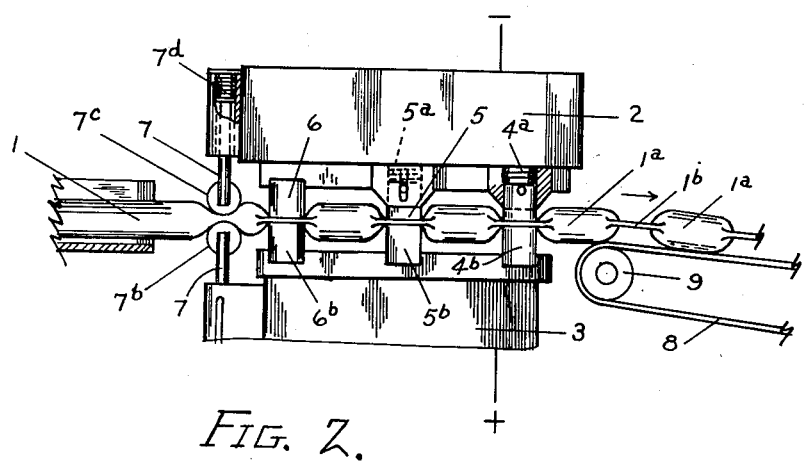
Figure 2 shows the press closed and the contents displaced by the presser part of the tool.

A filled tubing is marked 1, and an already produced container 1a, filled with fluid substance and sealed therein.

The sealed places are marked 1b.

The pressing tools marked 2 and 3, on applying pressure move in the direction of the arrows. One of the pressing tools, which is marked 2, is provided with presser parts 4, 5 and 6. The presser parts 4 and 5 are spring-loaded and the springs are marked 4a and 5a. The presser part 6 is fixed.

The pressing-tool part marked 3 is provided with presser parts 4b, 5b and 6b, all of which are in fixed position.

The individual container-presser members 4 and 5 carried by the tool 2 are arranged in stepped relationship with fixed individual container presser member 6. This construction permits the member 4 to contact the length of filled tubing 1 first followed by the member 5 and lastly the member 6. This has the effect of permitting the contents of the individual containers formed between the members 4, 5 and 6 to be distributed evenly therebetween and by means of the resilient or yieldable pressure means; namely, springs 4a and 5a, the contents of the tubing may be adjusted between the containers prior to the welding step.

On moving the pair of tools 2 and 3 in the direction of the arrows, firstly the contents will be displaced in the filled tubing by the opposed presser parts 4 and 4b; thereafter the contents will be displaced by the presser parts 5 and 5b and lastly by the presser parts 6 and 6b.

To regulate the backward flow of the displaced contents, buffers 7b and 7c are carried by support members 7d which are also spring-loaded 7d, and the pressure of the spring 7 can be adjusted so that the displaced contents can move backwards, but a certain pressure will remain in the tubing without danger of bursting. The transport band is marked 8 moving on the roller 9.

The welding tool in accordance with the present invention, is particularly provided for high frequency welding. It is essential that the radio frequency heating generates the heat only after all presser parts of the tools have displaced the contents from the pressure places in the filled tubing, as otherwise no welding success will be achieved.

Naturally, the welding tool in accordance with the present invention, can also be used if impulse heating is employed.

What I claim is:

1. For use in the production of individually sealed thermoplastic containers from a length of thermoplastic tubing containing a fluid substance and being sealed at one end, a multiple welding tool comprising a first and a second presser-welding member, the said presser-welding members being reciprocatable towards and away from each other, means for passing a length of thermoplastic tubing containing the fluid substance between the said presser-welding members, said first presser-welding member being adapted to be connected to a terminal of an electrical supply source and said second presser-welding member being adapted to be connected to another terminal of an electrical supply source, opposed pairs of individual container-presser tool members one of each of said opposed pairs of tool members being carried by said first presser-welding member and the other of each of said opposed pairs of tool members being carried by said second presser-welding member, and resilient loading means between all but at least one of said individual container-presser tool members carried by said first presser-welding member, said resiliently loaded individual tool members having tube contacting surfaces in stepped relation whereby upon reciprocation of said first and second presser-welding members towards each other under pressure the tool members close upon the filed tubing in opposed pairs successively until all the opposed pairs of tool members are simultaneously in their closed position.

2. An improved multiple welding tool as claimed in claim 1 wherein said pairs of individual container-presser members are at least three in number and wherein at least one of each pair of individual container-presser members is carried in a stepped relationship with respect to the other individual container-presser member carried by the same presser-welding element whereby they will close in succession upon the length of thermoplastic tubing upon which they are pressed, their order of contact commencing with the first element closest the sealed end of said length of filled tubing.

3. An improved multiple welding tool for use in the production of individually sealed thermoplastic containers to be produced from a length of thermoplastic tubing containing a fluid substance and being sealed at one end comprising a pair of presser-welding elements between which said length of thermoplastic tubing is adapted to be passed, one of said presser-welding members adapted to be connected to one electrode of an electrical welding device and the other presser-welding member being adapted to be connected to the other electrode of said electrical welding device, pairs of individual container-presser members carried by said presser-welding members at least one of each of which is carried in stepped relation to the others, spring pressure means between said individual container-presser members and said presser-welding members for causing said individual container-presser members closest the sealed end of said tubing to close in successive pairs upon the length of thermoplastic tubing containing the fluid substance under different degrees of pressure permitting the fluid substance in said tubing to be distributed evenly among the containers formed between adjacent spaced individual container-presser members, and resiliently loaded buffer means carried by each of said presser-welding members and being positioned to engage said filled length of thermoplastic tubing prior to said tubing being contacted by said pairs of individual container presser members and to partially close upon said length of thermoplastic tubing upon the descent of said presser-welding member upon said length of tubing, said buffer means being situated at the end of said presser-welding element furthest from the first individual container persser members to contact the length of filled tubing.

4. For use with a presser welding machine having positive and negative electrode elements movable toward and away from one another and between which is adapted to be passed a filled length of thermoplastic tubing containing a fluid substance and being sealed at the end being passed through the machine between the electrode elements, a multiple welding tool comprising a pair of presser-welding elements adapted to be connected one to the positive electrode element and the other to the negative electrode element, opposed pairs of individual container-presser tool members one of each pair of which is carried by said first presser welding member and the other of each pair of which is carried by said second presser welding member, and resilient loading means between all but one of said individual container-presser tool members carried by said first presser welding member, said resiliently loaded individual tool members having their tube contacting surfaces in stepped relation whereby upon pressing said first and second presser welding members together the individual container tool members will close upon the filled tubing in successive opposed pairs and the resilient loading of said tool members will permit substantially equal volumetric adjustment of the contents between the individual containers being formed.

References Cited in the file of this patent

UNITED STATES PATENTS

| Number | Name | Date |
|---|---|---|
| 1,242,562 | Laskey | Oct. 9, 1917 |
| 1,481,866 | Heist | Jan. 29, 1924 |
| 2,134,862 | Dunnam | Nov. 1, 1938 |
| 2,145,941 | Maxfield | Feb. 7, 1939 |
| 2,414,157 | Marziani | Jan. 14, 1947 |
| 2,430,995 | Roos | Nov. 18, 1947 |
| 2,530,400 | Rado | Nov. 21, 1950 |